(12) United States Patent
Bolta

(10) Patent No.: US 7,123,130 B2
(45) Date of Patent: Oct. 17, 2006

(54) COMBINATION L.E.D. EMERGENCY LAMP, GLASS CUTTER HAMMER PICK WITH SMOKE TRIGGERED POWER ON

(76) Inventor: Charles Bolta, 625 Mathews St., Ft. Collins, CO (US) 80524

( * ) Notice: Subject to any disclaimer, the term of this patent is extended or adjusted under 35 U.S.C. 154(b) by 6 days.

(21) Appl. No.: 10/824,136

(22) Filed: Apr. 14, 2004

(65) Prior Publication Data

US 2004/0207534 A1    Oct. 21, 2004

Related U.S. Application Data

(60) Provisional application No. 60/463,192, filed on Apr. 16, 2003.

(51) Int. Cl.
*H01C 1/00* (2006.01)
(52) U.S. Cl. .................. 340/321; 340/332; 340/815.73; 340/815.74
(58) Field of Classification Search ...................... None
See application file for complete search history.

(56) References Cited

U.S. PATENT DOCUMENTS

| | | | | |
|---|---|---|---|---|
| 5,034,847 | A | * | 7/1991 | Brain ........................ 362/205 |
| 5,952,916 | A | * | 9/1999 | Yamabe ..................... 340/468 |
| 6,000,811 | A | * | 12/1999 | Bordak ....................... 362/158 |
| 6,144,309 | A | * | 11/2000 | Fagence .................. 340/691.1 |
| 6,206,541 | B1 | * | 3/2001 | Landamia ................... 362/184 |
| 6,308,355 | B1 | * | 10/2001 | McMillan et al. ............. 7/142 |
| 6,317,047 | B1 | * | 11/2001 | Stein et al. .............. 340/573.1 |
| 6,727,805 | B1 | * | 4/2004 | Hollister et al. ............ 340/326 |

* cited by examiner

*Primary Examiner*—Benjamin C. Lee
*Assistant Examiner*—Son Tang
(74) *Attorney, Agent, or Firm*—Emery L. Tracy

(57) ABSTRACT

An emergency lamp for use in an area during ambient low light conditions is provided. The emergency lamp comprises a hand-held housing having a first end and a second end with at least one light emitting source within the housing. A power mechanism mounted within the housing illuminates the light emitting source. An activation mechanism activates the power mechanism only during low light conditions.

19 Claims, 6 Drawing Sheets

COMBINATION L.E.D. EMERGENCY LAMP, GLASS CUTTER HAMMER PICK WITH SMOKE TRIGGERED POWER ON

The present application is a continuation of provisional patent application Ser. No. 60/463,192, filed on Apr. 16, 2003, now abandoned, entitled "Combination L.E.D. Emergency Lamp, Glass Hammer with Smoke Triggered Power On".

BACKGROUND OF THE INVENTION

1. Field of the Invention

This invention relates generally to a Light Emitting Diode (L.E.D.) emergency lamp and, more particularly, the invention relates to a portable L.E.D. lamp having a smoke triggered power on and combines an emergency lamp and glass cutter hammer pick.

2. Description of the Prior Art

During emergency conditions, ambient light levels typically become obscured by smoke or darkness. While many buildings have emergency lighting in fixed locations for use during these emergency conditions, many times the lighting does not illuminate enough of the area or through thick smoke levels for people to exit the buildings safely. For instance, in the building, the lighting may be blocked by thick smoke. This could lead to serious injury by obscuring a person's vision and/or objects in the egress path.

Accordingly, there exists a need for a portable L.E.D. lamp which provides ample lighting for a person attempting to escape close to the floor in emergency conditions in a building. Additionally, a need exists for a portable L.E.D. lamp which is automatically powered upon a drop in ambient light such as caused by smoke or darkness. Furthermore, there exists a need for a portable L.E.D. lamp and communication and location device which can also be used to score and/or break glass to assist a person from leaving a building during emergency conditions.

SUMMARY

The present invention is an emergency lamp for use in an area during ambient low light conditions. The emergency lamp comprises a hand-held housing having a first end and a second end with at least one light emitting source within the housing. Power means mounted within the housing illuminates the light emitting source. Activation means activates the power mechanism only during low light conditions.

The present invention further includes a non-tethered portable lighting apparatus for providing light during a predetermined event. The portable lighting apparatus comprises a case having a housing portion and an insert portion receivable within the housing portion with the housing portion and the insert portion each having a first end and a second end. An electronics and battery module pack is mounted in the approximate center of the insert portion between the first end and the second end of the insert portion with the electronics and battery module pack receivable within the housing portion. A first lens holder is mounted adjacent the first end of the insert portion and a second lens holder is mounted adjacent the second end of the insert portion. A first L.E.D. light is mounted to the first lens holder and illuminatable from the first end of the housing portion and a second L.E.D. light is mounted to the second lens holder and illuminatable from the second end of the housing portion. Upon the housing portion receiving the insert portion, the case is hermetically sealed.

DETAILED DESCRIPTION OF THE PREFERRED EMBODIMENTS

As illustrated in FIGS. 1–6, the present invention is an L.E.D. emergency lamp, indicated generally at 10, with embedded electronics for power turn on with the loss of ambient light due to smoke or no power. The emergency lamp 10 of the present invention pertains to a portable or non-tethered apparatus used in emergency lighting consisting of multiple elements configured as a single system. The inherent design of the emergency lamp 10 of present invention allows for the insertion of custom electronic modules in an electronics and battery module pack 12 increasing the capability of the unit and the ease of use of the emergency lamp 10.

The emergency lamp 10 of the present invention is a non-tethered portable apparatus enabling fixed or flashlight configurations via quick disconnects (not shown). A combination of sensors and hammer capability with hardened L.E.D. emitters allow the unique embodiment of a pickaxe and light source. Further detail describing the components and features of the emergency lamp 10 are provided below.

Figure 1:
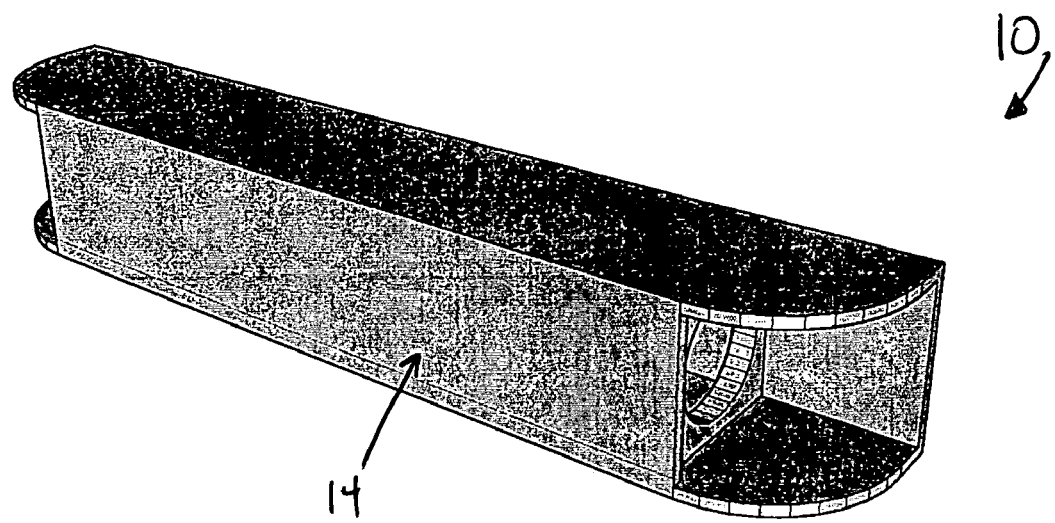
FIG. 1 is a perspective view illustrating an assembled L.E.D. emergency lamp, constructed in accordance with the present invention, with the L.E.D emergency lamp contained in a sealed case acting as a heat exchanger.

Referring to FIG. 1, the emergency lamp 10 of the present invention is preferably mounted approximately eighteen (18") inches above the floor (not shown) on an adjacent wall (not shown) although mounting the emergency lamp 10 at any level or position is within the scope of the present invention. AC power is supplied to the L.E.D. safety lamp 10 to charge and trickle charge the internal electronics and battery module pack 12. When smoke or darkness fills the area where the emergency lamp 10 is mounted, the emergency lamp 10 will turn on emitting light from both sides of the emergency lamp 10. It is within the scope of the present invention, however, for the emergency lamp 10 to emit light from only one side of the emergency lamp 10 or any combination of sides of the emergency lamp 10.

Figure 2:
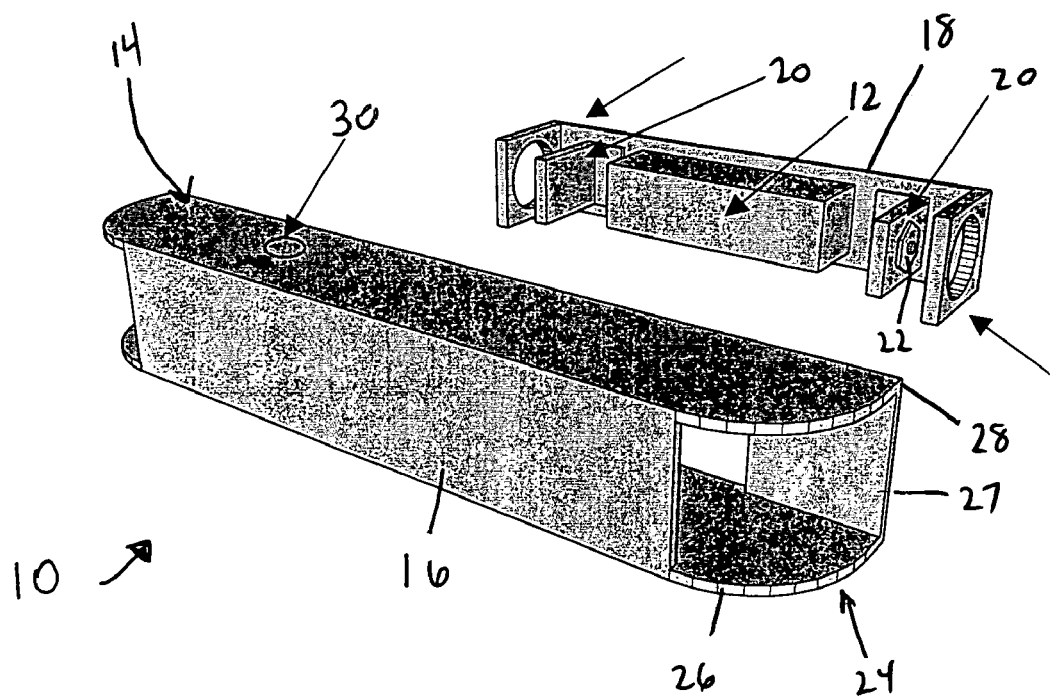
FIG. 2 is a perspective view illustrating a disassembled L.E.D. emergency lamp of FIG. 1, constructed in accordance with the present invention, with the sealed case removed indicating component placements.

Referring to FIG. 2, as mentioned above, the emergency lamp 10 preferably includes a sealed case 14 allowing light emission and ambient light sensing. The case 14 includes a housing portion 16 and an insert portion 18 receivable within the housing portion 16. Lens holders 20 are mounted within the case for mounting L.E.D.'s 22 thereon. The lens holders 20 also serve as heat sinks for the L.E.D.s 22.

The case 14 of the emergency lamp 10 preferably has an optical power on switch that turns on progressively more power as the pathway dims due to smoke or darkness from no power and preserves battery charge. Light emission is adjustable to cover an entire hallway from an angled beam. Tapered ends 24 on the case 14 diminish the effects of impact collisions from carts or pedestrians by offering a wedge to deflect the offending impact object.

The case 14 of the emergency lamp 10 of the present invention further includes an optional pick-axe 28 with diamond glass scribe 26 which can be attached in a folded down storage position and latched in a ninety (90°) degrees position for use in an emergency situation.

The emergency lamp 10 further includes an electronics and battery module pack 12 mounted within the case 14 for processing the exterior ambient light and powering on the L.E.D.s 22 within the emergency lamp 10. The battery and electronic module pack 12 combination is preferably located at the approximate center of the case 14 of the emergency lamp 10 where the human hand would grasp the emergency lamp 10 if it were to be used as a hammer to break glass. Basically, the electronics and battery module pack 12 is positioned in the approximate center of the emergency lamp 10 so when used as a hammer or pick, the effect of the mass of the batteries is minimized as best as possible.

As mentioned above, the emergency lamp 10 of the present invention further includes a glass cutter/hammer 26, 28 for cutting and fatiguing tempered glass. The glass cutter 26 scores the glass and the hammer 28 facilitates glass breakage of scored tempered glass or breakage of non-tempered glass.

An ambient light pipe 30 allows for a finger to operate light as a test or a mobile flashlight when the emergency lamp 10 is removed from the wall where the normal operation is intended. The light pipe 30 also lets light through to the CDS (cadmium sulfide photocell) sensors 32, as described further below.

Figure 3:
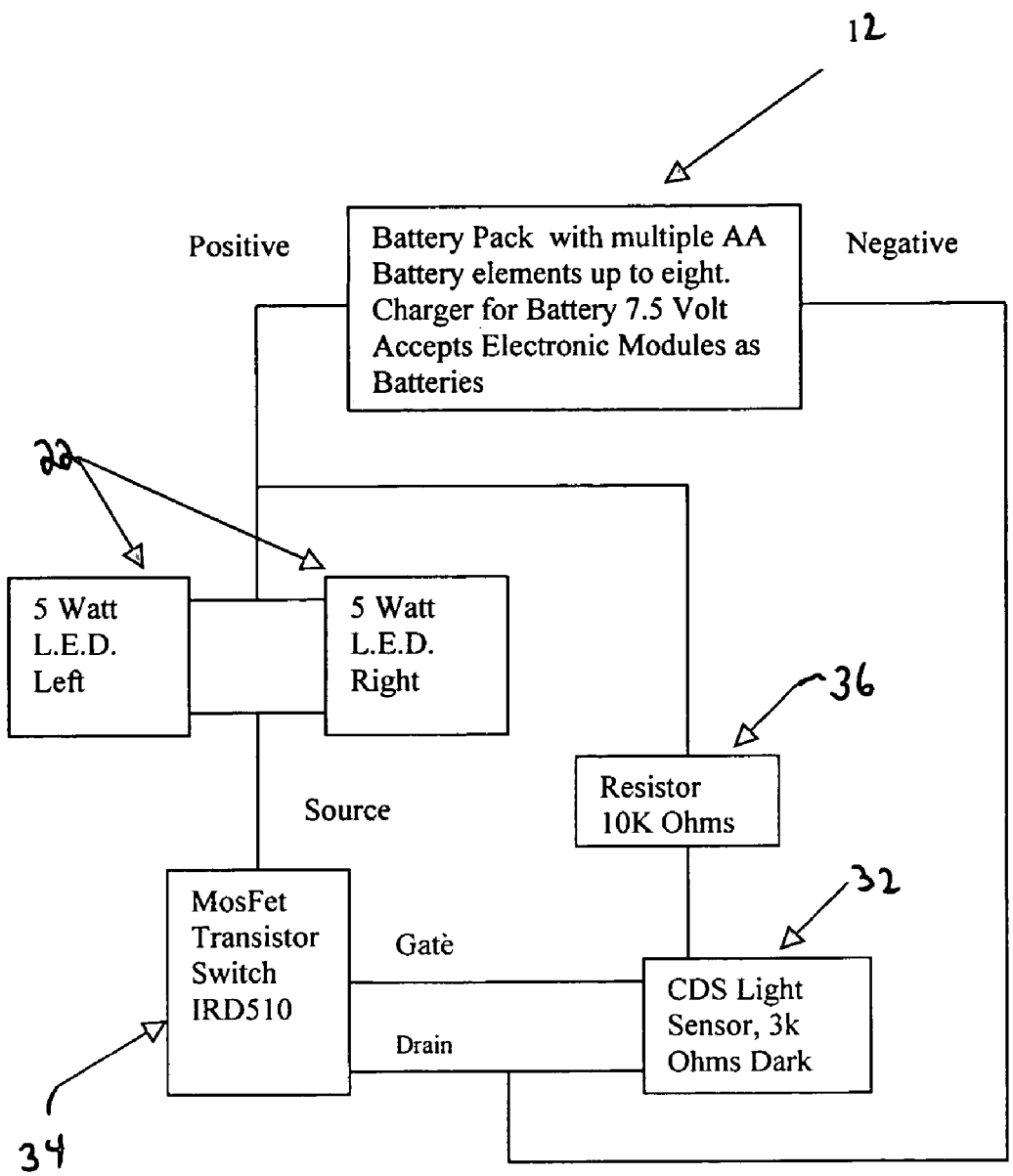
FIG. 3 is a schematic view illustrating the electronics of the L.E.D. emergency lamp, constructed in accordance with the present invention, with the components identified.

Referring to FIG. 3, the electronics and battery module pack 12 is designed to operate on AA batteries although other modes of powering the electronics and battery module pack 12 are within the scope of the present invention. Both 1.2 volt and 1.5 volt rechargeable battery cells can be used or any size is within the scope of the present invention. Extra AA battery storage is included in the battery pack so that custom electronics can be added to the electronics and battery module pack 12 in the physical shape of batteries so as to be customizable. One such module, for example, is a theft or locator beacon.

Construction of the electronics and battery module pack 12 allows custom electronic modules of specific use to be inserted into the electronics and battery module pack 12 similar to an AA battery being inserted into the electronics and battery module pack 12. An external battery charger can be located inside a wall with DC connections accommodating the emergency lamp 10.

The electronics and battery module pack 12 of the emergency lamp 10 of the present invention includes a CDS sensor 32 changing from 8K ohms to 3K ohms when darkness falls on its face. This drop in resistance applied to the Gate of Mosfet transistor 34 then switches on to apply power to the L.E.D.s 22. A resistor 10k ohm 36 is selected to establish when to turn on the Mosfet 34. In this implementation, a value of 10k ohms ignores ambient daylight.

The CDS sensor 32 is selected to begin changing value so as to save battery power when total darkness is not present such as in a smoke filled envelope. The electronics and battery module pack 12 is sized to operate for ninety (90) minutes with five (5) watt L.E.D.s 22.

Figure 4:
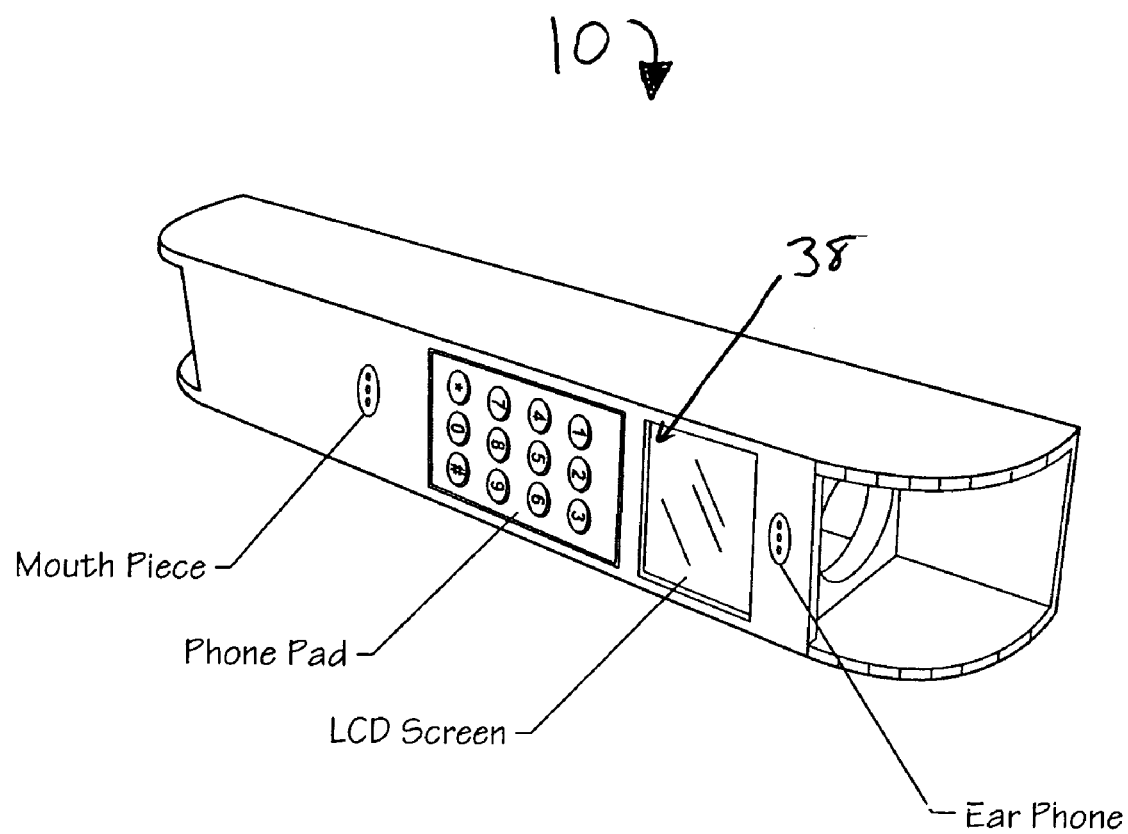
FIG. 4 is a top plan view illustrating the L.E.D. emergency lamp, constructed in accordance with the present invention, with a Global Positioning Satellite (GPS)/(Personal Data Assistant (PDA)/cell phone/walkie-talkie component.
Figure 5:
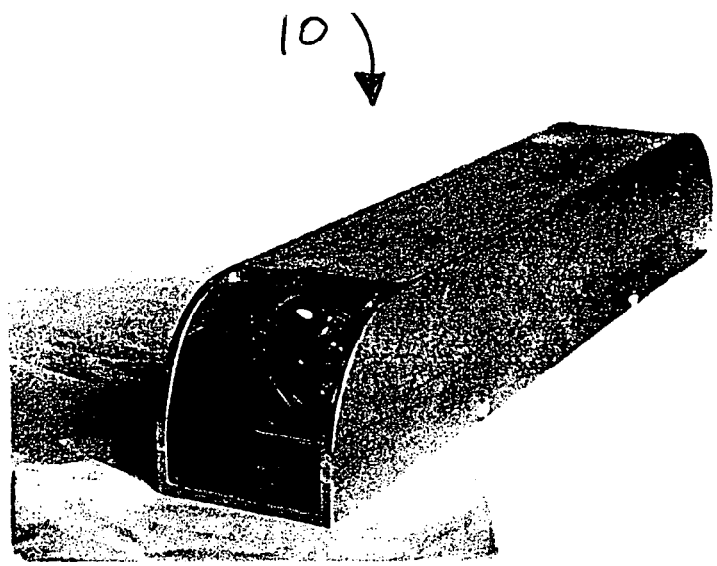
FIG. 5 is a perspective view illustrating the L.E.D. emergency lamp, constructed in accordance with the present invention.
Figure 6:
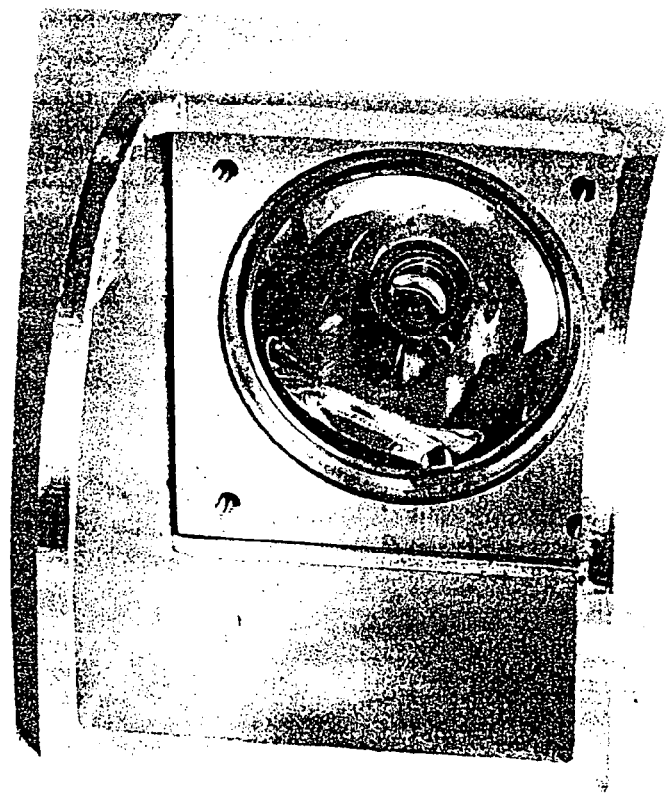
FIG. 6 is another perspective view illustrating the L.E.D. emergency lamp of FIG. 5, constructed in accordance with the present invention.
Figure 7:
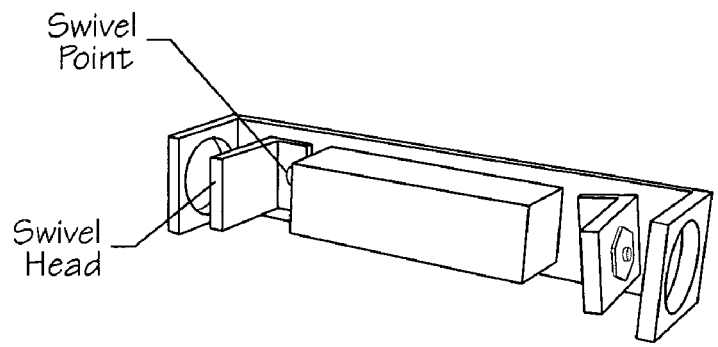
FIG. 7 is a perspective view illustrating the L.E.D. emergency lamp, constructed in accordance with the present invention, with an L.E.D. light adjustable and angled.
Figure 8:
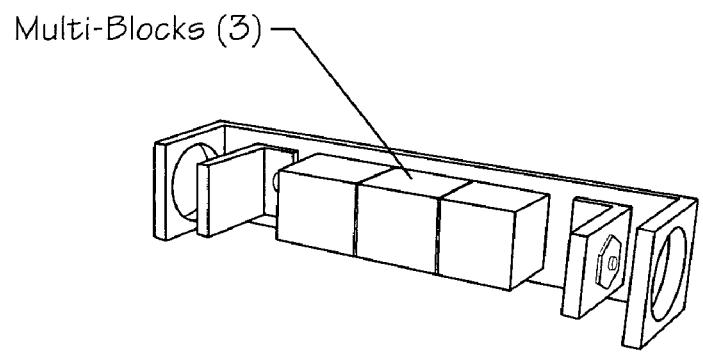
FIG. 8 is a perspective view illustrating the L.E.D. emergency lamp, constructed in accordance with the present invention, with custom electronic modules sized and shaped for being received the battery compartment.
Figure 9:
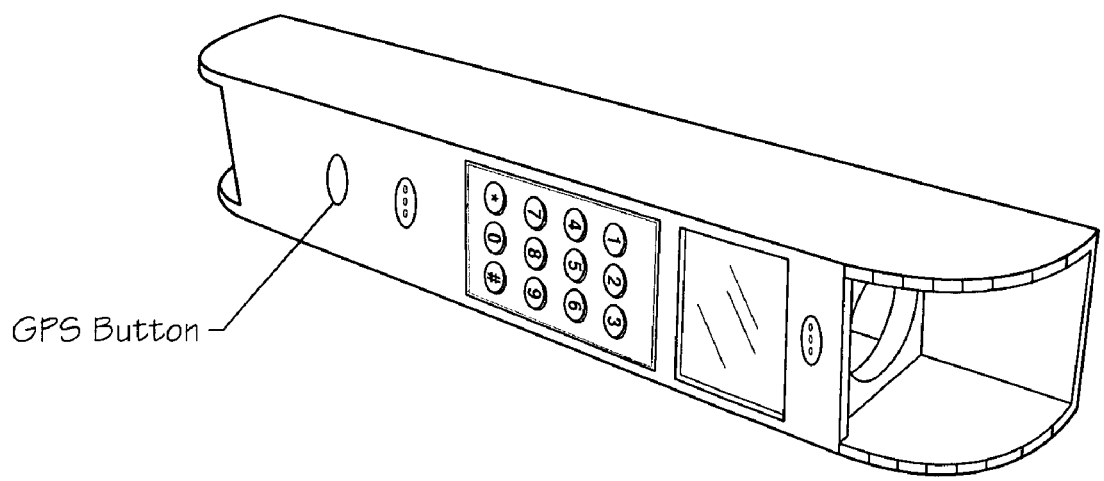
FIG. 9 is a perspective view illustrating the L.E.D. emergency lamp, constructed in accordance with the present invention, with a Global Positioning Satellite (GPS)
Figure 10:
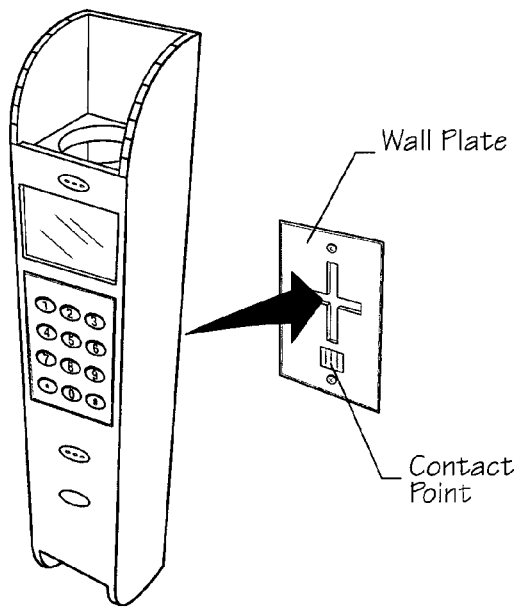
FIG. 10 is a perspective view illustrating the L.E.D. emergency lamp, constructed in accordance with the present invention, the housing edge is attachable in a folded down storage position latchable in a ninety (90°) degrees position.
Figure 11:
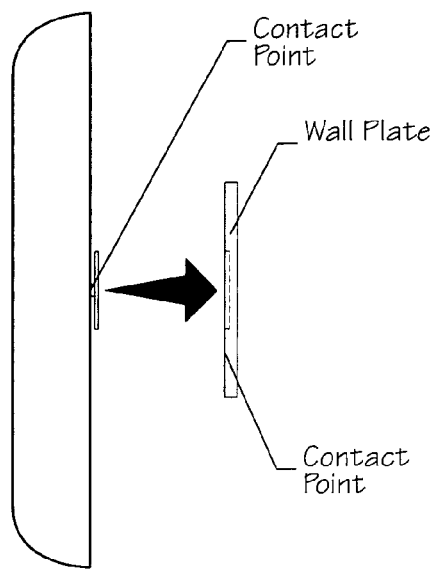
FIG. 11 is a perspective view illustrating the L.E.D. emergency lamp, constructed in accordance with the present invention, the housing edge is attachable in a folded down storage position latchable in a ninety (90°) degrees position.
Figure 12:
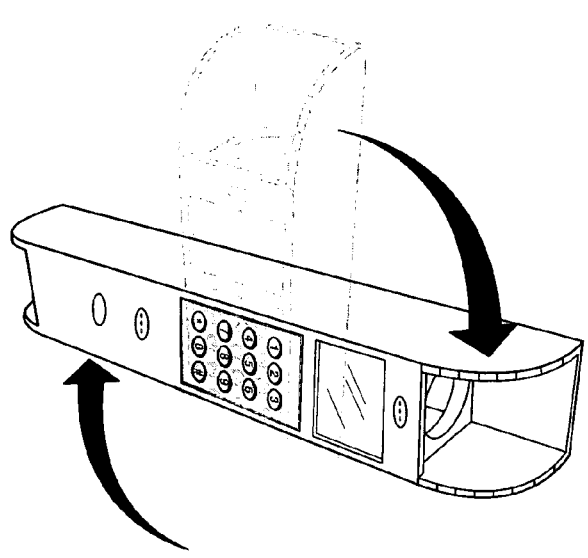
FIG. 12 is a perspective view illustrating the L.E.D. emergency lamp, constructed in accordance with the present invention, the housing edge is attachable in a folded down storage position latchable in a ninety (90°) degrees position.

As illustrated in FIG. 4, the emergency lamp 10 of the present invention additionally includes a combination GPS/cell phone/walkie-talkie/PDA unit 38 mounted on the face of the emergency lamp 10. The emergency lamp 10 is preferably able to accommodate future upgrades in technology. In operation, upon command, a GPS map can illuminate and provide a person using the emergency lamp 10 an escape route. Of course, the emergency lamp 10 can be removed from the wall or other storage location and used as a portable device.

The emergency lamp 10 of the present invention can plug into a central fire command system. A central command or the like can provide blocked areas to the emergency light and further provide two way communications.

The emergency lamp 10 of the present invention preferably includes sensors (not shown) for sensing for levels for toxins, i.e., anthrax, and heavier than air gases which would drop to the floor. Furthermore, the emergency lamp 10 can have sensors for sensing smoke, water, and combustibles. Basically, any type of sensor used in a fire safety control unit can be placed inside the emergency lamp 10.

The emergency lamp 10 of the present invention can also be installed in a flush mount box (not shown) in the wall, floor, or ceiling and can be activated to pop or rotate open positioning the emergency lamp 10 to work properly. This function can be activated by signal from any or all of the following:

1. Central fire control system;
2. Power outage;
3. Smoke sensor in unit or any type of sensor needed for protection;
4. Radio controlled activated; and/or
5. Emergency button on flush mount.

The emergency lamp 10 of the present invention can be disconnected from the wall or other storage location for use as a portable flashlight, GPS, or cell phone/walkie-talkie.

The disconnect of the emergency lamp 10 can be accomplished by any number of quick disconnect devices on the market.

In sum, the emergency lamp 10 of the present invention is an integrated L.E.D. light mounted within a hermetically sealed metal case 14 that can be used as a hammer pick and glass cutter in emergency situations. Furthermore, the emergency lamp 10 can be used to shovel debris or the like, when desired, with the lip portion 27.

The emergency lamp 10 has the ability to accept custom electronic modules that can be plugged into the AA battery compartment in the shape of any battery size. Modules can be selected from an emergency locator beacon, a theft transmitter, and an LCD screen such as a Palm Pilot for communicating egress information or a cell phone, GPS walkie-talkie combined.

The emergency lamp 10 of the present invention provides an apparatus that can illuminate hall or pathways on the occasion to be darkened with loss of light due to smoke or no power in emergency situation. The emergency lamp 10 can be used in egress situations and is preferably mounted on the wall eighteen (18") inches above the floor. The emergency lamp 10 can be removed from wall and locator beacon could track person and help guide them out. AC mains charge internal batteries and keep the lamp at ready for emergency use for a duration of 1.5 hours. Battery life is extended by decreasing power to the light emitter as the level of light increases and increasing power to the light emitter as the level of darkness increases.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An emergency lamp for use in an area during ambient low light conditions, the emergency lamp comprising:
    a hand-held housing having a first end and a second end;
    a first light emitting source mounted to the first end of the housing;
    a second light emitting source mounted at the second end of the housing;
    first scoring means formed on first end of the housing and surrounding the first light emitting source;
    second scoring means formed on the second end of the housing and surrounding the second light emitting source;
    power means mounted within the housing for illuminating the light emitting source; and
    activation means for activating the power means only during low light conditions; wherein the first and second scoring means are diamond glass cutter edges.

2. The emergency lamp of claim 1 and further comprising:
    a battery housing formed within the housing; and
    custom electronic modules sized and shaped for being received the battery compartment.

3. The emergency lamp of claim 2 wherein the modules are selected from the group consisting of a Global Positioning Satellite (GPS), a cell phone, a personal data assistant (PDA), and an LCD screen.

4. The emergency lamp of claim 2 wherein the modules are selected from the group consisting of an emergency locator beacon and a theft transmitter.

5. The emergency lamp of claim 1 wherein the light emitting source is an L.E.D. light.

6. The emergency lamp of claim 5 and further comprising:
    a first L.E.D. light mounted at the first end of the housing; and
    a second L.E.D. light mounted at the second end of the housing;
    wherein light is simultaneously emitted from the first end of the housing and the second end of the housing.

7. The emergency lamp of claim 6 wherein the lights have beams which are adjustable and angled.

8. The emergency lamp of claim 1 wherein the first end of the housing at the first scoring means is tapered and the second end of the housing at the second scoring means is tapered.

9. The emergency lamp of claim 1 wherein the housing is attachable in a folded down storage position latchable in a ninety (90°) degrees position.

10. The emergency lamp of claim 1 wherein the power means are positioned in the approximate center of the housing.

11. The emergency lamp of claim 1 wherein the power means are rechargeable batteries selected from the group consisting of 1.2 volt and 1.5 volt.

12. The emergency lamp of claim 1 wherein the power means are activated by a signal from a source selected from the group consisting of central fire control system, power outage, smoke sensor, radio, and emergency button.

13. A non-tethered portable lighting apparatus for providing light during a predetermined event, the portable lighting apparatus comprising:
    a case having a housing portion and an insert portion receivable within the housing portion, the housing portion and the insert portion each having a first end and a second end;
    an electronics and battery module pack mounted in the approximate center of the insert portion between the first end and the second end of the insert portion, the electronics and battery module pack receivable within the housing portion;
    a first lens holder mounted adjacent the first end of the insert portion;
    a second lens holder mounted adjacent the second end of the insert portion;
    a first L.E.D. light mounted to the first lens holder and illuminatable from the first end of the housing portion; and
    a second L.E.D. light mounted to the second lens holder and illuminatable from the second end of the housing portion;
    first scoring means formed on first end of the housing and surrounding the first light emitting source;
    second scoring means formed on the second end of the housing and surrounding the second light emitting source;
    wherein upon the housing portion receiving the insert portion, the case is hermetically sealed; wherein the first and second scoring means are diamond glass cutter edges.

14. The portable lighting apparatus of claim 13 wherein the electronics and battery module packs include electronics selected from the group consisting of a GPS, a cell phone, a PDA, and an LCD screen.

15. The portable lighting apparatus of claim 13 and further comprising:
an optical power on switch on the housing portion of the case for progressively activating additional power as ambient light dims such as by covering the light sensor.

16. The portable lighting apparatus of claim 13 wherein the first and second L.E.D. lights have beams which are adjustable and angled.

17. The portable lighting apparatus of claim 13 wherein the housing portion of the case has tapered ends.

18. The portable lighting apparatus of claim 13 wherein the first and second scoring means are a hammer pick to break glass, and a shovel lip.

19. The portable lighting apparatus of claim 13 wherein the electronics and battery module pack is activated by a signal from a source selected from the group consisting of central fire safety control system, power outage, smoke sensor, radio, and emergency button.

* * * * *